United States Patent Office.

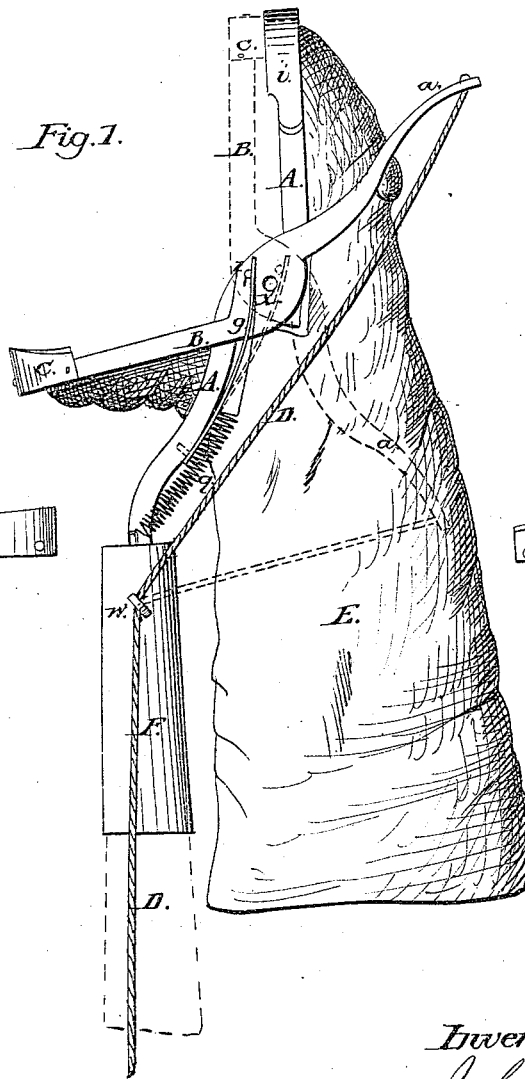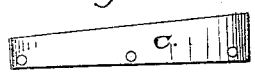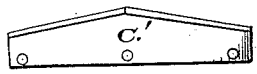

JOHN BALLY, OF DEPOSIT, NEW YORK.

Letters Patent No. 64,472, dated May 7, 1867.

FRUIT-PICKER.

The Schedule referred to in these Letters Patent and making part of the same.

TO ALL WHOM IT MAY CONCERN:

Be it known that I, JOHN BALLY, of Deposit, in the county of Delaware, and in the State of New York, have invented certain new and useful improvements in Fruit-Pickers; and I do hereby declare that the following is a full, clear, and exact description thereof, reference being had to the accompanying drawings, and to the letters of reference marked thereon, making a part of this specification.

My invention consists in a neat and handy device for picking fruit without breaking or bruising the fruit or the tree, and a device for forcing the buds and leaves away from the fruit desired to be picked.

In the annexed drawings, A represents a metallic jaw, which is inserted into a metallic socket, F, and has a semicircle formed at its top. Hinged to this jaw is the movable jaw B, which is also made in a semicircular form, corresponding with and facing the jaw A. Each of these jaws has an arm, the arm of jaw A being inserted into the socket, while the arm $a$ of the jaw B is free, having the cord D secured at its extreme end. $i$ represents a metallic shield, which is placed upon the top of the jaw A, and into which the knife upon the jaw B is passed instead of bruising the tree, when picking the fruit. C C′ represent the knives used in cutting the fruit. These knives may be either convex in the centre, as shown in Figure 3, or may be of the form shown in Figure 1, and are placed upon the top of jaw B. $y$ represents a steel spring, which strike against a lug, $z$, upon the outer face of the jaw B, near where it is pivoted, $x$, to the jaw A, and is intended to distend the jaws after being closed. A spiral spring, $q$, may be used instead of this steel spring. E represents a section of the bag which receives the fruit, and is connected to the jaws A and B by means of small openings in the jaws. A pole is placed in the socket F, and the cord D, of suitable length to reach the ground when the jaws are elevated up into the tree. The jaws being thus distended, the operator draws his cord, allowing the apple or other fruit to be between the jaws and cut by the knife, when it falls into the bag, and the jaws (by means of the spring) again distended and ready for another operation.

What I claim, is—

The jaws A and B, constructed as described, and provided with knife C, shield $i$, and spring, when used in combination with the socket F and bag E for the purposes specified.

In testimony that I claim the foregoing I have hereunto set my hand and seal this 26th day of March, 1867.

JOHN BALLY. [L. S.]

Witnesses:
　L. T. FREEMAN,
　ASAHEL CUMMING.